United States Patent
Hart et al.

(10) Patent No.: US 11,549,493 B2
(45) Date of Patent: Jan. 10, 2023

(54) SYSTEM AND METHOD FOR FREQUENCY FILTERING OF A RENEWABLE ENERGY POWER SYSTEM

(71) Applicant: General Electric Company, Schenectady, NY (US)

(72) Inventors: Patrick Hammel Hart, Ballston Lake, NY (US); Charles Joseph Kosuth, Albany, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/937,658

(22) Filed: Jul. 24, 2020

(65) Prior Publication Data

US 2022/0025865 A1 Jan. 27, 2022

(51) Int. Cl.
*F03D 17/00* (2016.01)

(52) U.S. Cl.
CPC ........ *F03D 17/00* (2016.05); *F05B 2270/337* (2013.01)

(58) Field of Classification Search
CPC ........................... F03D 17/00; F05B 2270/337
See application file for complete search history.

(56) References Cited

U.S. PATENT DOCUMENTS

| | | | |
|---|---|---|---|
| 8,301,311 | B2 | 10/2012 | Nelson |
| 9,570,916 | B2 | 2/2017 | Nielsen et al. |
| 9,915,244 | B2 | 3/2018 | Tarnowski |
| 10,458,392 | B2 | 10/2019 | Bluhm |
| 2015/0214738 | A1* | 7/2015 | Covic ............... H02J 13/00004 307/31 |
| 2016/0305403 | A1* | 10/2016 | Zheng .................. F03D 7/0224 |
| 2017/0022977 | A1* | 1/2017 | Garcia ...................... H02J 3/16 |

FOREIGN PATENT DOCUMENTS

| | | |
|---|---|---|
| DE | 3632041 A1 | 4/1987 |
| DE | 102013204600 A1 | 9/2014 |
| EP | 2505832 B1 | 8/2018 |
| WO | WO 2012/019785 A2 | 2/2012 |
| WO | WO 2012/171532 A2 | 12/2012 |
| WO | WO2020008036 A1 | 1/2020 |

OTHER PUBLICATIONS

European Search Report for EP Application No. 21183489.0, dated Dec. 23, 2021.

* cited by examiner

*Primary Examiner* — Tulsidas C Patel
*Assistant Examiner* — Joseph Ortega
(74) *Attorney, Agent, or Firm* — Dority & Manning, P.A.

(57) ABSTRACT

A method for controlling a renewable energy power system having at least one renewable energy asset connected to a power grid during a frequency event includes receiving, via a controller, a frequency signal of the power grid. The method also includes determining a time constant for a frequency filter assembly as a function of two or more parameters of the frequency signal. Further, the method includes filtering the frequency signal via the frequency filter assembly using the determined time constant. Moreover, the method includes determining a power command for the at least one renewable energy asset using the filtered frequency signal. In addition, the method includes controlling the at least one renewable energy asset based on the power command.

15 Claims, 7 Drawing Sheets

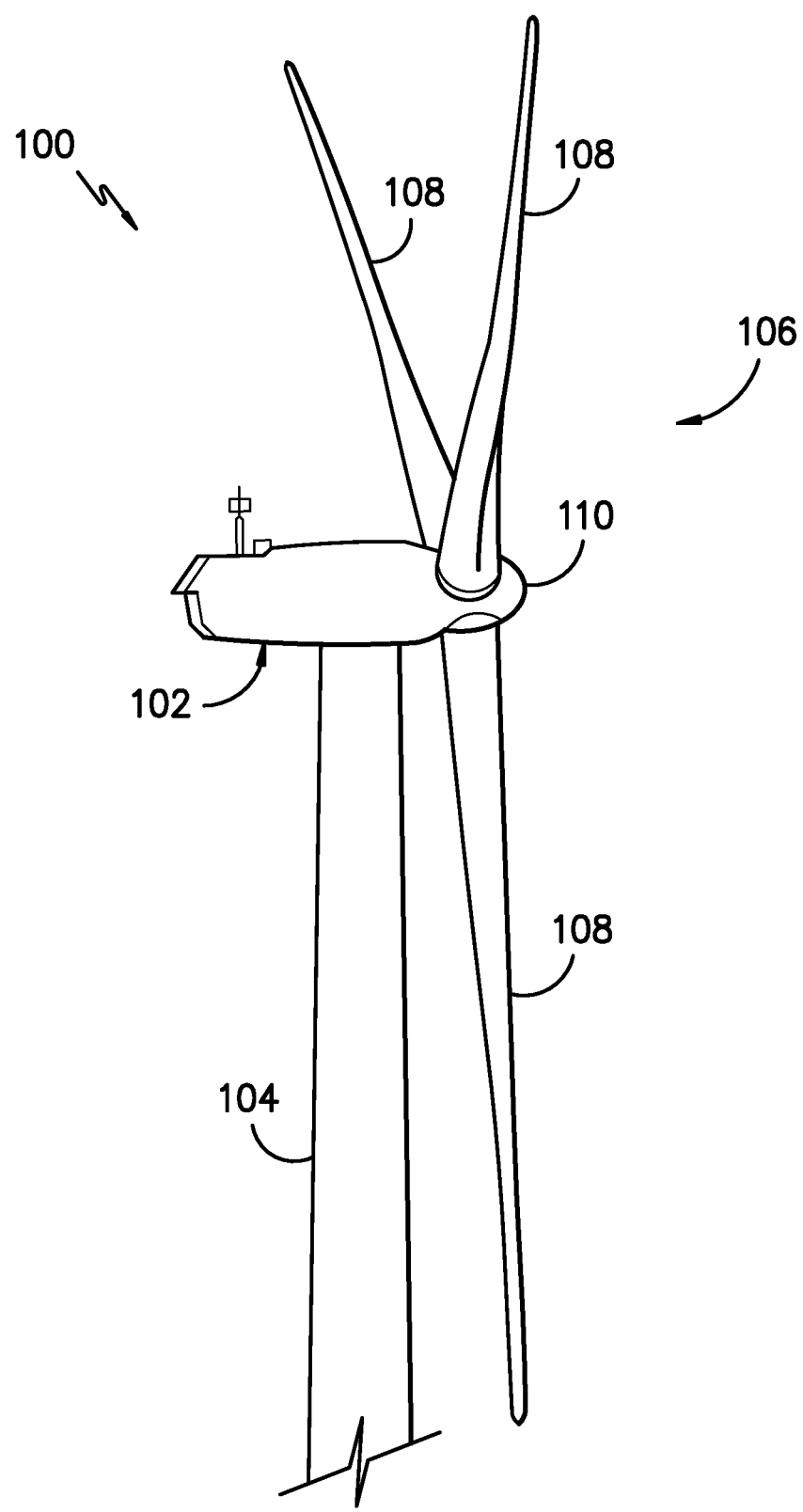
FIG. -1-

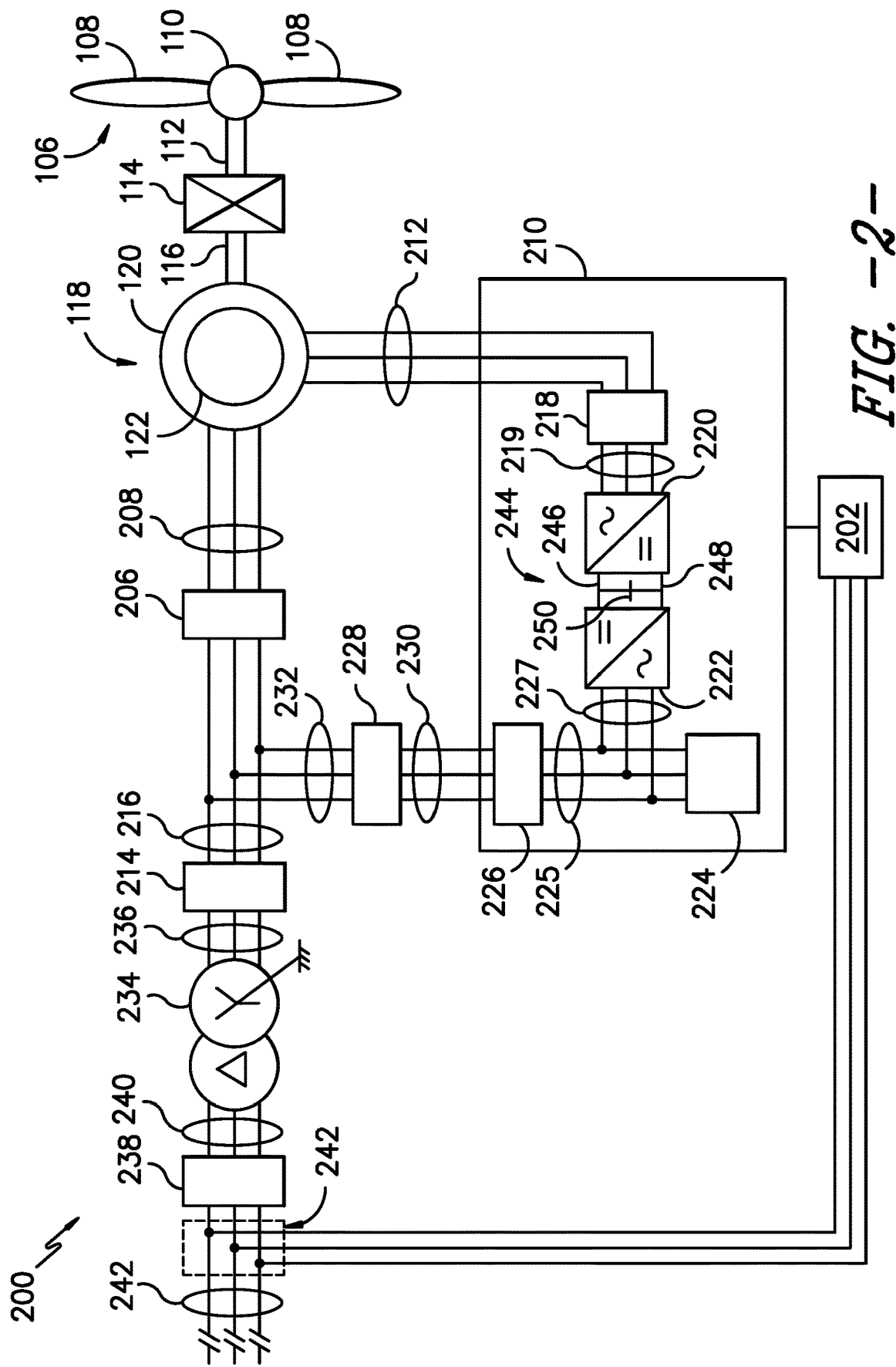
FIG. -2-

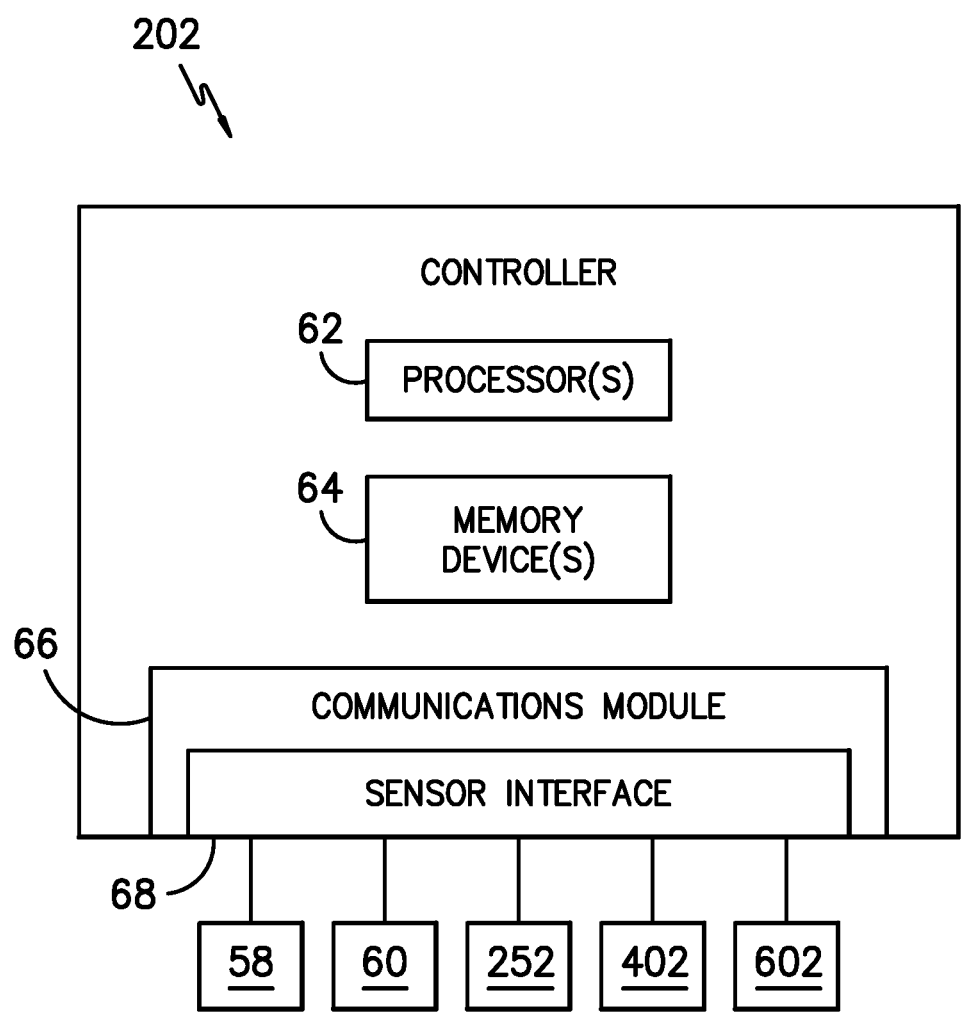
FIG. -3-

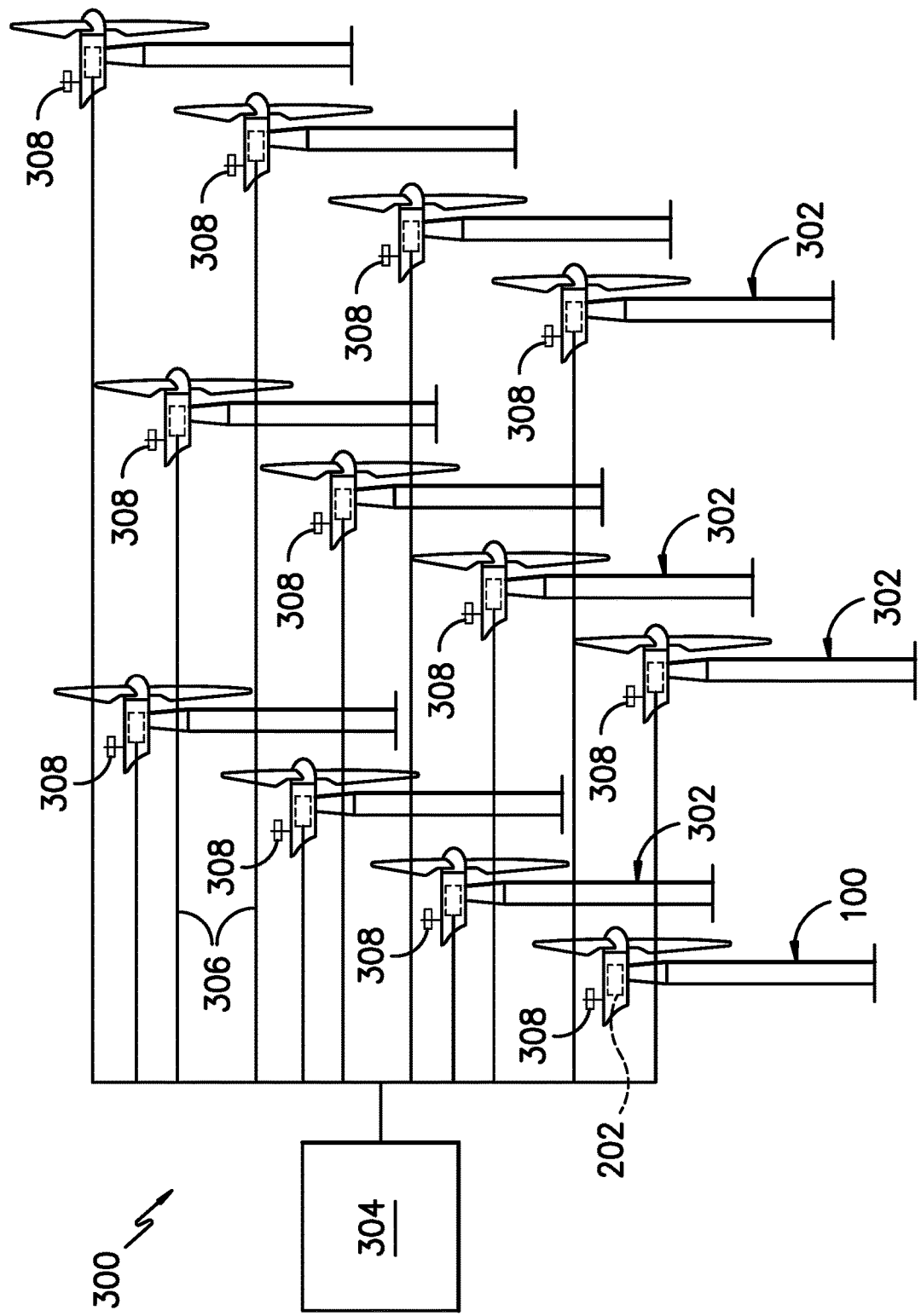
FIG. -4-

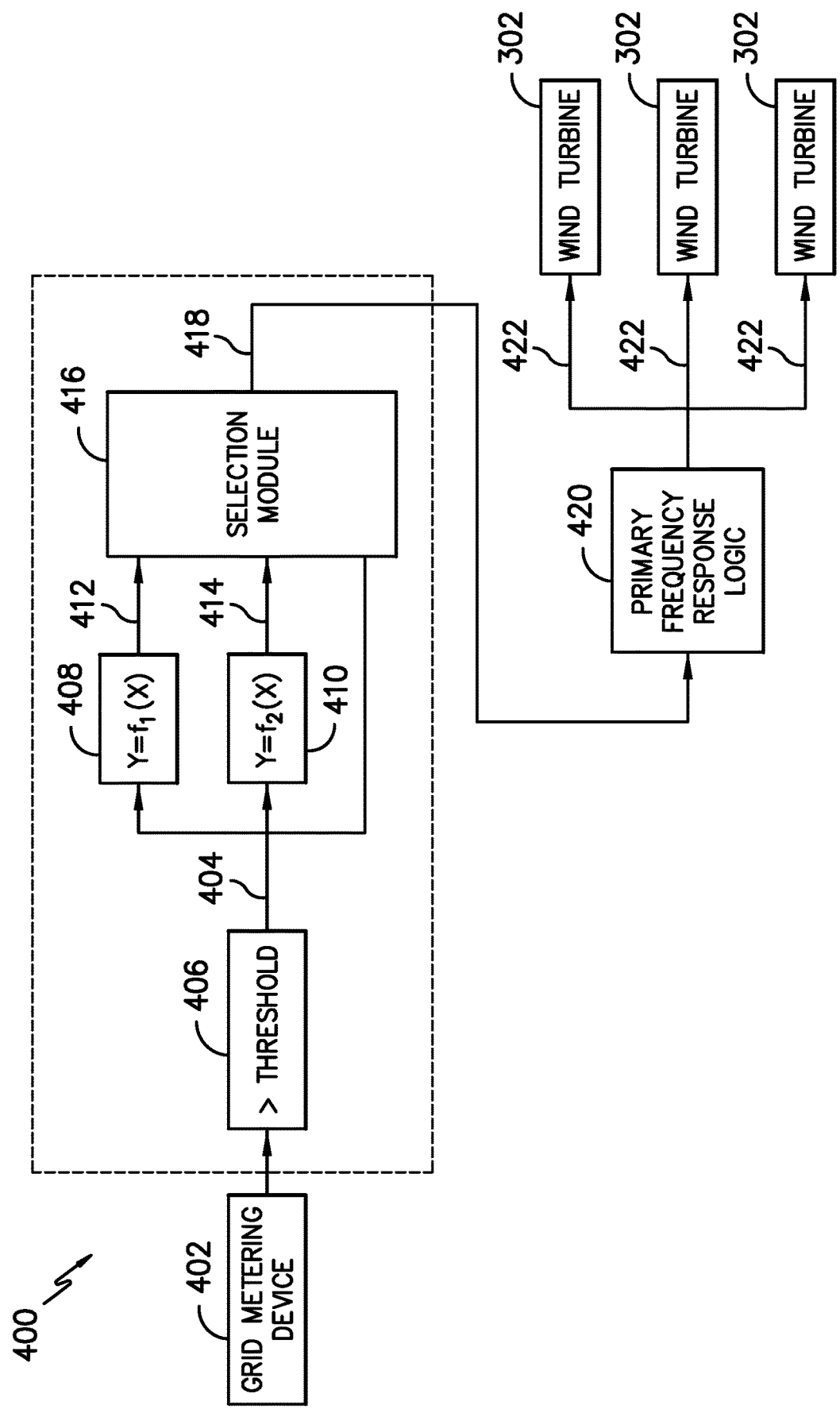
FIG. -5-

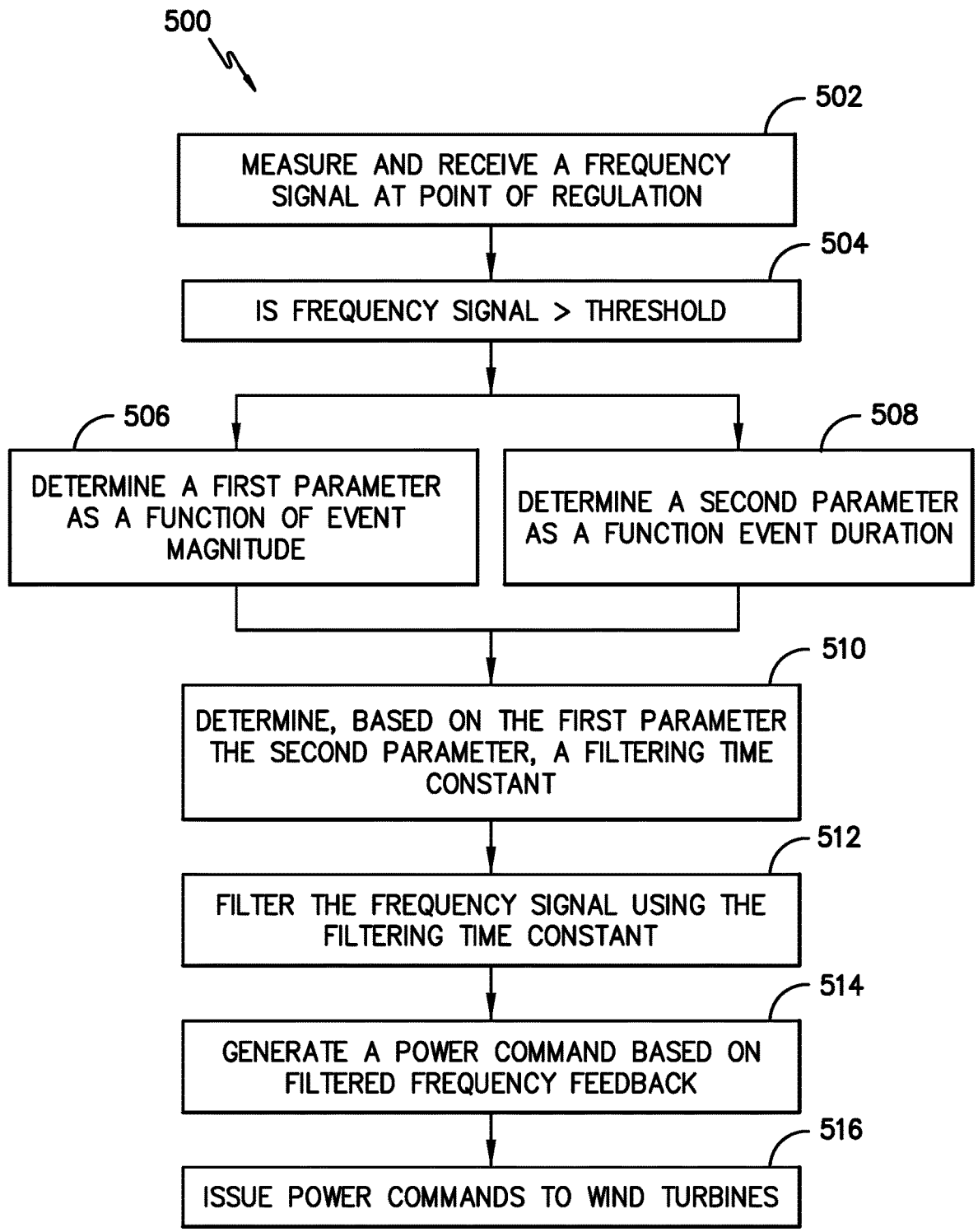
FIG. -6-

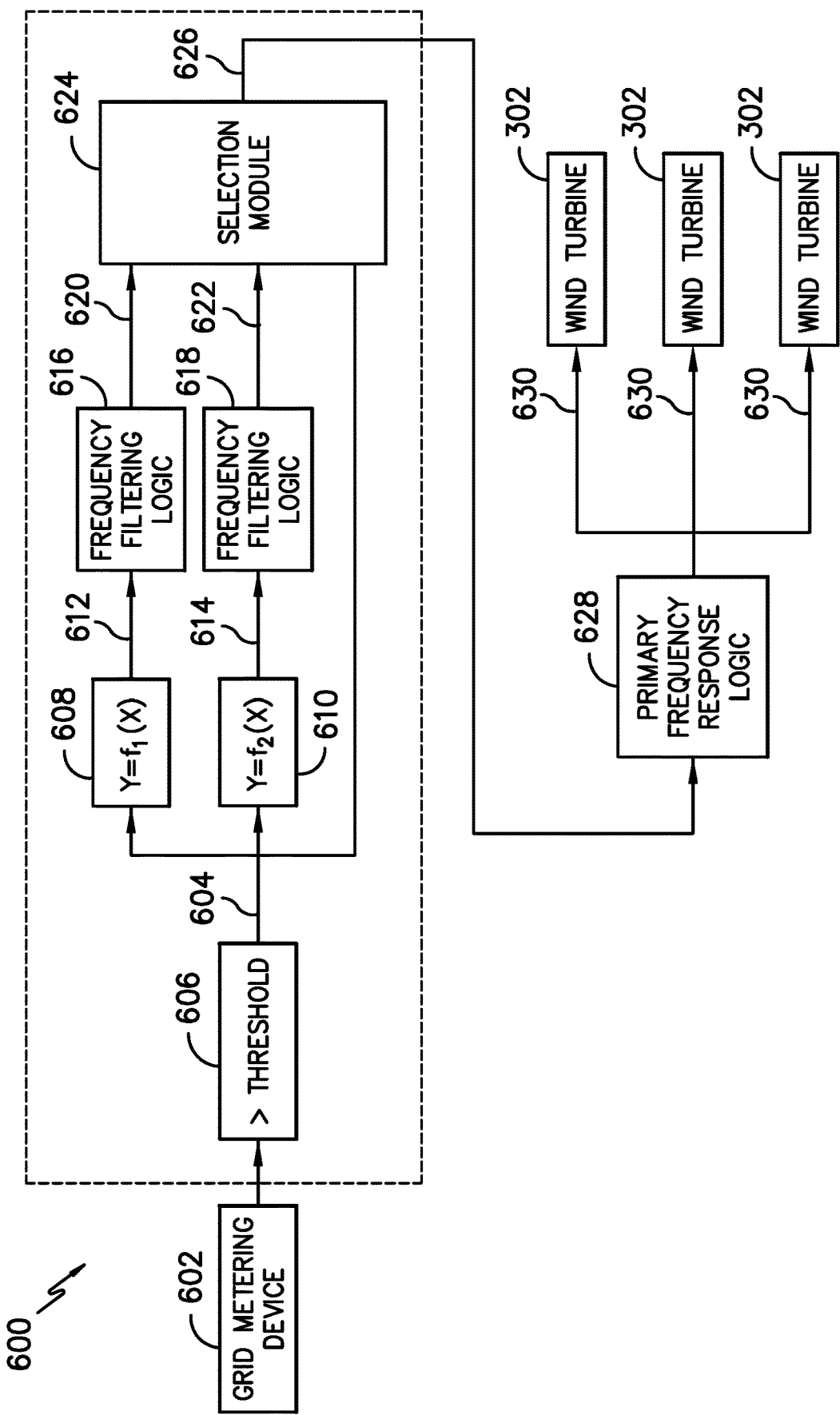
FIG. -7-

SYSTEM AND METHOD FOR FREQUENCY FILTERING OF A RENEWABLE ENERGY POWER SYSTEM

FIELD

The present disclosure relates generally to electrical power systems and, more particularly, to a system and method for controlling an electrical power system connected to a power grid in response to frequency events using a frequency filter.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

More specifically, during operation of a wind turbine, wind impacts the rotor blades and the blades transform wind energy into a mechanical rotational torque that drives a low-speed shaft. The low-speed shaft drives the gearbox that subsequently steps up the low rotational speed of the low-speed shaft to drive a high-speed shaft at an increased rotational speed, wherein the high-speed shaft rotatably drives a generator rotor. In many conventional wind turbine configurations, the generator is electrically coupled to a bi-directional power converter that includes a rotor-side converter (RSC) joined to a line-side converter (LSC) via a regulated DC link. The LSC converts the DC power on the DC link into AC output power that is combined with the power from the generator stator to provide multi-phase power having a frequency maintained substantially at the frequency of the electrical grid bus (e.g. 50 HZ or 60 HZ). The above system is generally referred to as a doubly-fed induction generator (DFIG) system.

When providing primary frequency response services, there are at least two concerns when maintaining grid frequency stability. First, measurable events typically occur when a large generating source or load is tripped offline. These are characterized by a steep initial disturbance to frequency along with a rapid recovery as generators on the system respond to the observed disturbance. Second, a long sustained event, which may or may not be significant in magnitude, occurs during periods of time when the generating sources (increasingly provided by renewables) experiences a significant increase or reduction in resource availability. For example, such events may be observed when a sustained change in wind speed or irradiance occurs in a region densely populated by renewable generation.

Accordingly, the requirement for primary frequency response to address the aforementioned events is becoming more prevalent in grid regulations. The trend in grid requirements has been towards tighter deadbands around the nominal frequency at which time the generator response is enabled and towards faster reaction and settling times. These trends have resulted in renewable assets, such as wind turbine power systems, spending a good deal of time responding to frequency events. Furthermore, frequency can be difficult to measure, thereby resulting in significant noise on the control feedback.

Thus, an improved system and method for dynamically filtering frequency that does not impact the response time to the aforementioned significant events, while also eliminating noise that causes repeated response from the renewable assets, would be welcomed in the technology.

BRIEF DESCRIPTION

Aspects and advantages of the invention will be set forth in part in the following description, or may be obvious from the description, or may be learned through practice of the invention.

In one aspect, the present disclosure is directed to a method for controlling a renewable energy power system having at least one renewable energy asset connected to a power grid during a frequency event. The method includes receiving, via a controller, a frequency signal of the power grid. The method also includes determining a time constant for a frequency filter assembly as a function of two or more parameters of the frequency signal. Further, the method includes filtering the frequency signal via the frequency filter assembly using the determined time constant. Moreover, the method includes determining a power command for the at least one renewable energy asset using the filtered frequency signal. In addition, the method includes controlling the at least one renewable energy asset based on the power command.

In an embodiment, the method may include measuring the frequency signal via one or more sensors. In another embodiment, the two or more parameters may include, at least, a first parameter and a second parameter. For example, in such embodiments, the first parameter and second parameters may be dependent on at least one of a magnitude of the frequency event, a duration of the frequency event, or a rate of change of frequency response. In further embodiments, the parameters dependency on frequency may be further dependent on whether the frequency event is a high frequency event or a low frequency event.

In further embodiments, the method may include setting the first parameter to be dependent on a maximum observed magnitude of the frequency event such that a response time of the renewable energy power system is reduced during the frequency event and resetting the first parameter to an initial value only after the frequency event is over to ensure that the time constant remains fast for the duration of the frequency event.

In additional embodiments, determining the time constant for the frequency filter assembly as a function of two or more parameters of the frequency signal may include utilizing at least one of a look-up table, a function, or an algorithm.

In particular embodiments, the method may include comparing the frequency signal to a frequency threshold to determine the presence of the frequency event occurring in the power grid. In further embodiments, the frequency event may include at least one of a high frequency event, a low frequency event, or a frequency event of a certain duration.

In certain embodiments, the method may include resetting the time constant to a default value when the filtered frequency returns within a certain frequency deadband or threshold.

In another embodiment, the renewable energy power system may be a wind turbine power system, an energy storage system, a solar power system, or combinations thereof. Accordingly, the renewable energy asset(s) may include a wind turbine, a solar panel, an energy storage device, or combinations thereof, such as hybrid power systems.

In yet another aspect, the present disclosure is directed to a method for controlling a renewable energy power system having at least one renewable energy asset connected to a power grid during a frequency event. The method includes receiving, via a controller, a frequency signal of the power grid. The method also includes filtering the frequency signal via a first frequency filter having a dynamic time constant, the dynamic time constant varying as a function of a first parameter. The method may further include filtering the frequency signal via a second frequency filter having a dynamic time constant, the dynamic time constant varying as a function of a second parameter of the frequency signal. Thus, the method includes selecting one of the filtered frequency signals. Moreover, the method includes controlling the at least one renewable energy asset based on the selected filtered frequency signal. It should be understood that the method may further include any combination of the additional features and/or steps as described herein.

In yet another aspect, the present disclosure is directed to a system for controlling a renewable energy power system having at least one renewable energy asset connected to a power grid during a frequency event. The system includes one or more sensors for measuring a frequency signal of the power grid, a frequency filter assembly for filtering the frequency signal, and a controller. The frequency filter assembly has a dynamic time constant. For example, the dynamic time constant varies as a function of two or more parameters of the frequency signal. Further, the controller is configured to perform a plurality of operations, including but not limited to determining a power command for the at least one renewable energy asset using the filtered frequency signal and controlling the at least one renewable energy asset based on the power command. It should be understood that the system may further include any combination of the additional features and/or steps as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a schematic view of one embodiment of an electrical and control system that may be used with the wind turbine shown in FIG. 1;

FIG. 3 illustrates a block diagram of one embodiment of suitable components that may be included within a controller of the wind turbine according to the present disclosure;

FIG. 4 illustrates a schematic diagram of one embodiment of a wind farm having a plurality of wind turbines according to the present disclosure;

FIG. 5 illustrates a schematic diagram of one embodiment of a system for controlling a renewable energy power system having at least one renewable energy asset connected to a power grid during a frequency event according to the present disclosure;

FIG. 6 illustrates a flow diagram of one embodiment of a method for controlling a renewable energy power system having at least one renewable energy asset connected to a power grid during a frequency event according to the present disclosure; and FIG. 7 illustrates a schematic diagram of one embodiment of a system for controlling a renewable energy power system having at least one renewable energy asset connected to a power grid during a frequency event according to the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for controlling a renewable energy power system, such as a wind turbine, connected to a power grid during a frequency event. It should be understood that the present disclosure can also be used for DFIG systems, full conversion systems, battery storage systems, and/or solar inverters. More specifically, the present disclosure uses at least two factors to drive a dynamic filter applied to the raw frequency feedback. In an embodiment, the two factors, which may be the duration and the depth of the frequency event, can align with the grid stability efforts that are required to maintain a stable operating frequency.

In conventional systems, a fixed time constant is used to filter frequency. Further, there is a required balance between speed of response and the ability to reject noise that would cause an undesirable disturbance to the renewable power production. Thus, the present disclosure introduces a dynamic dependency upon the at least two factors to determine how quickly to filter the raw frequency feedback. For example, in an embodiment, this includes the determination of when to apply different time constants, how the variables impact the time constant, and/or when to revert back to a heavily filtered time constant.

Referring now to the drawings, FIG. 1 illustrates a schematic view of one embodiment of a wind turbine 100 according to the present disclosure. As shown, the wind turbine 100 includes a nacelle 102 housing a generator (not shown). The nacelle 102 may be mounted on a tower 104 (a portion of the tower 104 being shown in FIG. 1). The tower 104 may be any height that facilitates operation of wind turbine 100 as described herein. The wind turbine 100 also includes a rotor 106 that includes a plurality of rotor blades 108 attached to a rotating hub 110. More specifically, as shown, the wind turbine 100 includes three rotor blades 108 attached to the hub 110. Alternatively, the wind turbine 100 may include any number of rotor blades 108 that facilitate operation of the wind turbine 100 as described herein. In an embodiment, the wind turbine 100 may also include a gearbox 114 (FIG. 2) rotatably coupled to the rotor 106 and a generator 118 (FIG. 2).

Referring particularly to FIG. 2, a schematic view of one embodiment of an electrical and control system 200 that may be used with the wind turbine 100 (shown in FIG. 1). As shown, the rotor 106 may be further rotatably coupled to a low-speed shaft 112. The low-speed shaft 112 may be coupled to a step-up gearbox 114. The gearbox 114 may be configured to step up the rotational speed of low-speed shaft 112 and transfer that speed to a high-speed shaft 116. In an embodiment, the gearbox 114 can have a step-up ratio of approximately 70:1. For example, the low-speed shaft 112 rotating at approximately 20 revolutions per minute (20) coupled to gearbox 114 with an approximately 70:1 step-up ratio generates the high-speed shaft 116 speed of approximately 1400 rpm. Alternatively, the gearbox 114 has any step-up ratio that facilitates operation of wind turbine 100 as described herein. Also, alternatively, the wind turbine 100 may include a direct-drive generator 118, wherein the generator 118 is rotatingly coupled to the rotor 106 without any intervening gearbox.

The high-speed shaft 116 is rotatably coupled to the generator 118. In an embodiment, the generator 118 may be a wound rotor, synchronous, 60 Hz, three-phase, doubly-fed induction generator (DFIG) that includes a generator stator 120 magnetically coupled to a generator rotor 122. Alternatively, the generator 118 may any generator of any number of phases that facilitates operation of the wind turbine 100 as described herein.

Thus, during operation, wind impacts the rotor blades 108 and the rotor blades 108 transform mechanical wind energy into a mechanical rotational torque that rotatingly drives the low-speed shaft 112 via the hub 110. The low-speed shaft 112 drives the gearbox 114 that subsequently steps up the low rotational speed of shaft 112 to drive the high-speed shaft 116 at an increased rotational speed. The high speed shaft 116 rotatingly drives the generator rotor 122 such that a rotating magnetic field is induced within the generator rotor 122 and a voltage is induced within the generator stator 120 that is magnetically coupled to the generator rotor 122. The generator 118 converts the rotational mechanical energy to a sinusoidal, three-phase alternating current (AC) electrical energy signal in the generator stator 120.

The electrical and control system 200 may also include a controller 202. In an embodiment, the controller 202 may include a computer or other suitable processing unit. Thus, in several embodiments, the controller 202 may include suitable computer-readable instructions that, when implemented, configure the controller 202 to perform various different functions, such as receiving, transmitting and/or executing control signals. As such, the controller 202 may generally be configured to control the various operating modes (e.g., conducting or non-conducting states) of the one or more switches and/or components of embodiments of the electrical system 200.

As used herein, the term computer is not limited to just those integrated circuits referred to in the art as a computer, but broadly refers to a processor, a microcontroller, a microcomputer, a programmable logic controller (PLC), an application specific integrated circuit, and other programmable circuits, and these terms are used interchangeably herein. In the exemplary embodiment, memory may include, but is not limited to, a computer-readable medium, such as a random access memory (RAM). Alternatively, a floppy disk, a compact disc-read only memory (CD-ROM), a magneto-optical disk (MOD), and/or a digital versatile disc (DVD) may also be used. Also, in the exemplary embodiment, additional input channels may be, but not be limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

For example, FIG. 3 illustrates a block diagram of one embodiment of suitable components that may be included within an embodiment of a controller 202, or any other computing device in accordance with aspects of the present subject matter. As shown, the controller 202 may include one or more processor(s) 62 and associated memory device(s) 64 configured to perform a variety of computer-implemented functions (e.g., performing the methods, steps, calculations and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 64 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 64 may generally be configured to store suitable computer-readable instructions that, when implemented by the processor(s) 62, configure the controller 202 to perform various functions including, but not limited to, directly or indirectly transmitting suitable control signals to one or more switches that comprise the bi-directional power conversion assembly 210, monitoring operating conditions of the electrical system 200, and various other suitable computer-implemented functions.

Additionally, the controller 202 may also include a communications module 66 to facilitate communications between the controller 202 and the various components of the electrical system 200. For instance, the communications module 66 may serve as an interface to permit the controller 202 to transmit control signals to any components of the wind turbine and electrical system 200. Moreover, the communications module 66 may include a sensor interface 68 (e.g., one or more analog-to-digital converters) to permit signals transmitted from the sensors (e.g., any of sensors 58, 60, 252, 402) to be converted into signals that can be understood and processed by the processors 62. Alternatively, the controller 202 may be provided with suitable computer readable instructions that, when implemented by its processor(s) 62, configure the controller 202 to take various actions depending upon the control mode of the wind turbine 100.

Referring back to FIG. 2, the generator stator 120 may be further electrically coupled to a stator synchronizing switch 206 via a stator bus 208. In the exemplary embodiment, to facilitate the DFIG configuration, the generator rotor 122 is electrically coupled to a bi-directional power conversion assembly 210 via a rotor bus 212. Alternatively, the system 200 may be configured as a full power conversion system, wherein a full power conversion assembly that is similar in design and operation to assembly 210 is electrically coupled to the stator 120 and such full power conversion assembly facilitates channeling electrical power between the stator 120 and an electric power transmission and distribution grid.

The stator bus 208 transmits three-phase power from the stator 120 and the rotor bus 212 transmits three-phase power from the rotor 122 to the assembly 210. The stator synchronizing switch 206 is electrically coupled to a main transformer circuit breaker 214 via a system bus 216.

The power conversion assembly 210 includes a rotor filter 218 that is electrically coupled to the rotor 122 via the rotor bus 212. The rotor filter 218 is electrically coupled to a rotor-side, bi-directional power converter 220 via a rotor filter bus 219. The rotor-side converter 220 is electrically coupled to a line-side, bi-directional power converter 222. The converters 220 and 222 may substantially identical. The line-side converter 222 is electrically coupled to a line filter 224 and a line contactor 226 via a line-side power converter bus 223 and a line bus 225. In an embodiment, the converters 220 and 222 are configured in a three-phase, pulse width modulation (PWM) configuration including insulated gate bipolar transistor (IGBT) switching devices. Alternatively, the converters 220 and 222 may have any configuration using any switching devices that facilitate operation of the system 200 as described herein. Further, as shown, the assembly 210 is coupled in electronic data communication with the controller 202 to control the operation of the converters 220 and 222.

The line contactor 226 is electrically coupled to a conversion circuit breaker 228 via a conversion circuit breaker bus 230. The circuit breaker 228 is also electrically coupled to the system circuit breaker 214 via the system bus 216 and the connection bus 232. The system circuit breaker 214 is electrically coupled to an electric power main transformer 234 via a generator-side bus 236. The transformer 234 is electrically coupled to a grid circuit breaker 238 via a breaker-side bus 240. The grid breaker 238 is connected to an electric power transmission and distribution grid via a grid bus 242.

Still referring to FIG. 2, the converters 220 and 222 are coupled in electrical communication with each other via a single direct current (DC) link 244. Alternatively, the converters 220 and 222 may be electrically coupled via individual and separate DC links. The DC link 244 includes a positive rail 246, a negative rail 248, and at least one capacitor 250 coupled therebetween. Alternatively, the capacitor 250 may be one or more capacitors configured in series or in parallel between the rails 246 and 248.

In one embodiment, as shown, the system 200 may also include one or more voltage sensors 252 electrically coupled to each one of the three phases of the bus 242. Alternatively, the voltage sensors 252 may be electrically coupled to the system bus 216. Also, alternatively, the voltage sensors 252 may be electrically coupled to any portion of the system 200 that facilitates operation of the system 200 as described herein.

During operation, the associated electrical power from the generator 118 is transmitted to main transformer 234 via bus 208, switch 206, bus 216, breaker 214 and bus 236. The main transformer 234 steps up the voltage amplitude of the electrical power and the transformed electrical power is further transmitted to a grid via bus 240, circuit breaker 238 and bus 242.

In the doubly-fed induction generator configuration, a second electrical power transmission path is provided. For example, as shown, electrical, three-phase, sinusoidal, AC power is generated within wound the rotor 122 and is transmitted to assembly 210 via the bus 212. Within the assembly 210, the electrical power is transmitted to the rotor filter 218, wherein the electrical power is modified for the rate of change of the PWM signals associated with the converter 220. The power converter 220 acts as a rectifier and rectifies the sinusoidal, three-phase AC power to DC power. The DC power is transmitted into the DC link 244. The capacitor 250 facilitates mitigating DC link voltage amplitude variations by facilitating mitigation of a DC ripple associated with AC rectification.

The DC power is subsequently transmitted from the DC link 244 to line-side converter 222, wherein the converter 222 acts as an inverter configured to convert the DC electrical power from the DC link 244 to three-phase, sinusoidal AC electrical power with pre-determined voltages, currents, and frequencies. This conversion is monitored and controlled via the controller 202. The converted AC power is transmitted from the line-side converter 222 to the bus 216 via buses 227 and 225, line contactor 226, bus 230, circuit breaker 228, and bus 232. The line filter 224 compensates or adjusts for harmonic currents in the electric power transmitted from the line-side converter 222. The stator synchronizing switch 206 is configured to close such that connecting the three-phase power from the stator 120 with the three-phase power from the assembly 210 is facilitated.

The circuit breakers 228, 214, and 238 are configured to disconnect corresponding buses, for example, when current flow is excessive and can damage the components of the system 200. Additional protection components are also provided, including line contactor 226, which may be controlled to form a disconnect by opening a switch (not shown in FIG. 2) corresponding to each of the lines of the line bus 230.

In addition, the assembly 210 may compensate or adjust the frequency of the three-phase power from the rotor 122 for changes, for example, in the wind speed at the hub 110 and the rotor blades 108. Therefore, in this manner, mechanical and electrical rotor frequencies are decoupled and the electrical stator and rotor frequency matching is facilitated substantially independently of the mechanical rotor speed.

The power converter assembly 210 and the generator 118 may be susceptible to grid voltage fluctuations and other forms of grid faults. The generator 118 may store magnetic energy that can be converted to high currents when a generator terminal voltage decreases quickly. Those currents can mitigate life expectancies of components of the assembly 210 that may include, but not be limited to, semiconductor devices such as the IGBTs within the converters 220 and 222.

Referring now to FIG. 4, as shown, the wind turbine 100 may be part of a wind farm 300 that includes a plurality of wind turbines 302 communicatively coupled to a farm controller 304 via a network 306. For example, as shown in the illustrated embodiment, the wind farm 300 includes twelve wind turbines, including wind turbine 100. However, in other embodiments, the wind farm 300 may include any other number of wind turbines, such as less than twelve wind turbines or greater than twelve wind turbines. In one embodiment, the controller 202 of the wind turbine 100 may be communicatively coupled to the farm controller 304 through a wired connection, such as by connecting the controller 202 through suitable communicative links (e.g., a suitable cable). Alternatively, the controller 202 may be communicatively coupled to the farm controller 304 through a wireless connection, such as by using any suitable wireless communications protocol known in the art. In addition, the farm controller 304 may be generally configured similar to the controllers 202 for each of the individual wind turbines 302 within the wind farm 300.

In several embodiments, one or more of the wind turbines 302 in the wind farm 300 may include a plurality of sensors for monitoring various operating data of the individual wind turbines 302 and/or one or more environmental parameters of the wind farm 300. For example, as shown, each of the wind turbines 302 may include a wind sensor 308, such as an anemometer or any other suitable device, configured for measuring wind speeds or any other wind parameter.

Referring now to FIGS. 5 and 6, a system 400 and method 500 for controlling a renewable energy power system, such as wind turbine power system 200, according to the present disclosure is illustrated. Referring particularly to FIG. 5, the system 400 includes at least one grid metering device or sensor 402 for monitoring one or more grid parameters. Thus, as shown, the grid sensor 402 is configured to generate a raw frequency signal 404. In an embodiment, an object of the present disclosure is to identify when the observed raw frequency signal 404 should be heavily filtered, and when such signal should be tracked as quickly as possible in order to respond to measurable events. Moreover, in an embodiment, the system 400 may receive raw frequency signal 404 and determine when a frequency event occurs. In particular embodiments, as shown at 406, frequency events can be identified by determining whether the raw frequency signal 404 exceeds a specific threshold either above or below the nominal frequency.

Thus, if the system 400 identifies a frequency event in the power grid, the raw frequency signal 404, which is generally noisy, may be sent to a plurality of time constant modules 408, 410. For example, in an embodiment, the time constant modules 408, 410 may include one or more algorithms programmed therein for calculating one or more parameters of the raw frequency signal 404. More specifically, in one embodiment, the parameters may include duration of the frequency event, the magnitude of the frequency event, a rate of chance of frequency response, as well as any other grid parameters that may impact the speed at which the raw frequency signal 404 is filtered. Therefore, the time constant modules 408, 410 are also configured to generate different time constants 412, 414 for the frequency filtering module 416. For example, in one embodiment, the time constant modules 408, 410 may use the measurements of duration and magnitude, respectively, to determine the applicable time constants, e.g. using a look-up table, a function, or an algorithm (e.g. such as a simple MIN(x, y) function or any other suitable algorithm or mathematical function) to determine which filtering time constant to use.

In certain embodiments, an important distinction for the parameter that depends on depth/duration of the event should be latched at the maximum value observed during the event. This maximum value can then be reset at the end of the frequency event, resulting in the effect that if a large event is observed, the time constant associated with the event remains fast for the duration of the event, even if the event magnitude returns to a smaller value in the meantime.

Still referring to FIG. 5, the system 400 includes a dynamic frequency filtering module 416 having at least one filter. Thus, once the frequency filtering time constant is determined, it can be applied to the raw frequency signal 404, using any suitable filter of the frequency filtering module 416. For example, in an embodiment, the frequency filtering module 416 may include a low-pass filter, a high-pass filter, a band-pass filter, a notch filter, or combinations thereof, or any other suitable filter. Moreover, in an embodiment, specific implementations of the filter(s) may be a lag filter, an exponential filter, a lead-lag compensator, a Kalman filter, or another other suitable implementation.

Accordingly, in an embodiment, the frequency filtering module 416 is dynamic in that the module 416 is capable of selecting the appropriate time constant based on the type of frequency event occurring in the power grid (and how fast the response needs to be). Since frequency is generally difficult to measure, the raw frequency signal 404 is generally very noisy and can cause too many control actions by the controller if relied upon alone. Further, as grid regulations are becoming more stringent (e.g. a deadband in the tens of milli-Hertz), the dynamic frequency filtering module 416 helps to minimize the number of times the controller 202 must respond to frequency events by more accurately filtering the raw frequency signal 404 based on the type of event. This results in fewer disturbances to the power generation profile, longer periods of time between responses, an increase in total annual energy production. More particularly, as shown, the output 418 of the frequency filtering module 416, also referred to as the filtered frequency signal, can then be sent to the primary frequency response logic 420, which determines how fast to respond to the frequency event by determining power commands 422 for each of the wind turbines 302 in the wind farm 300.

In still further embodiments, the system 400 can determine when to reset the filter time constant to the default value. Thus, in one embodiment, the system 400 can reset the time constant when the filtered frequency signal 418 returns within the frequency deadband, which ensures the raw frequency signal 4040 is not filtered heavily again before the filtered frequency signal 418 returns within the deadband.

Referring particularly to FIG. 6, a flow diagram of one embodiment of a method 500 for controlling a renewable energy power system, such as wind turbine power system 200 is illustrated. In general, the method 500 is described herein with reference to the wind turbine(s) 100, 302 of FIGS. 1-5. However, it should be appreciated that the disclosed method 500 may be implemented with wind turbines having any other suitable configurations. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (502), the method 500 includes measuring and receiving a frequency signal of the power grid, e.g. at a point of regulation. As shown at (504), the method 500 may include comparing the frequency signal to a frequency threshold to determine the presence of the frequency event occurring in the power grid. In certain embodiments, for example, the frequency event may include a high frequency event, a low frequency event, or a frequency event of a certain duration. If the frequency signal is indicative of a frequency event occurring in the power grid and the method continues at (506) and (508). More specifically, in an embodiment, the method 500 may include determining a time constant for a frequency filter assembly as a function of two or more parameters of the frequency signal. In certain embodiments, the two or more parameters may include, at least, a first parameter and a second parameter. For example, as shown at (506) and (508), the method 500 includes determining a first parameter and a second parameter as a function of event magnitude and event duration, respectively.

As shown at (510), the method 500 includes determining a time constant for a frequency filter assembly as a function of the first and second parameters of the frequency signal. As shown at (512), the method 500 includes filtering the frequency signal via the frequency filter assembly using the determined time constant. As shown at (514), the method 500 includes determining a power command for the at least one renewable energy asset, such as one of the wind turbines 302 described herein, using the filtered frequency signal. As shown at (516), the method 500 includes controlling the renewable energy asset(s) based on the power command.

In certain embodiments, the method 500 may also include resetting the time constant to a default value when the filtered frequency returns within a certain frequency deadband.

Referring now to FIG. 7, a schematic diagram of another embodiment of a system 600 for controlling a renewable energy power system, such as wind turbine power system 200, according to the present disclosure is illustrated. More specifically, as shown, the system 600 includes at least one grid metering device or sensor 602 for monitoring one or more grid parameters. Thus, as shown, the grid sensor 602 is configured to generate a raw frequency signal 604. In an embodiment, as mentioned, the system 600 is configured to identify when the observed raw frequency signal 604 should be heavily filtered, and when such signal should be tracked as quickly as possible in order to respond to measurable events. Moreover, in an embodiment, the system 600 may receive raw frequency signal 604 and determine when a frequency event occurs. In particular embodiments, as shown at 606, frequency events can be identified by determining whether the raw frequency signal 604 exceeds a specific threshold either above or below the nominal frequency.

Thus, if the system 600 identifies a frequency event in the power grid, the raw frequency signal 604, which is generally noisy, may be sent to a plurality of time constant modules 608, 610. For example, in an embodiment, the time constant modules 608, 610 may include one or more algorithms programmed therein for calculating one or more parameters of the raw frequency signal 604. More specifically, in one embodiment, the parameters may include duration of the frequency event, the magnitude of the frequency event, a rate of change of frequency response, as well as any other grid parameters that may impact the speed at which the raw frequency signal 604 is filtered. Therefore, the time constant modules 608, 610 are also configured to generate different time constants 612, 614 for the frequency filtering logic modules 616, 618, described herein below. For example, in one embodiment, the time constant modules 608, 610 may use the measurements of duration and magnitude, respectively, to determine the applicable time constants, e.g. using a look-up table, a function, or an algorithm (e.g. such as a simple MIN(x, y) function or any other suitable algorithm or mathematical function) to determine which filtering time constant to use.

Once the frequency filtering time constants 612, 614 are determined, they can be applied to the raw frequency signal 604, e.g. using any suitable filter of the frequency filtering logic modules 616, 618. For example, in an embodiment, the frequency filtering logic modules 616, 618 may include a low-pass filter, a high-pass filter, a band-pass filter, a notch filter, or combinations thereof, or any other suitable filter. Moreover, in an embodiment, specific implementations of the filter(s) may be a lag filter, an exponential filter, a lead-lag compensator, a Kalman filter, or another other suitable implementation. The filtered frequency values 620, 622 can then be sent to the frequency feedback selection module 624, which is configured to select one of the filtered frequency values 620, 622, i.e. depending upon the desired response time needed for the frequency event. The output 626 of the frequency feedback selection module 624 can then be sent to the primary frequency response logic 628, which determines how fast to respond to the frequency event by determining power commands 630 for each of the wind turbines 302 in the wind farm 300.

As described above and as will be appreciated by one skilled in the art, embodiments of the present invention may be configured as a system, method, or a computer program product. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable non-transitory computer-readable storage medium may be utilized including hard disks, CD-ROMs, optical storage devices, or magnetic storage devices.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a non-transitory computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Further aspects of the invention are provided by the subject matter of the following clauses:

Clause 1. A method for controlling a renewable energy power system having at least one renewable energy asset connected to a power grid during a frequency event, the method comprising:

receiving, via a controller, a frequency signal of the power grid;

determining a time constant for a frequency filter assembly as a function of two or more parameters of the frequency signal;

filtering the frequency signal via the frequency filter assembly using the determined time constant;

determining a power command for the at least one renewable energy asset using the filtered frequency signal; and, controlling the at least one renewable energy asset based on the power command.

Clause 2. The method of clause 1, further comprising measuring the frequency signal via one or more sensors.

Clause 3. The method of any preceding clause, wherein the two or more parameters comprise, at least, a first parameter and a second parameter, the first parameter and second parameters being dependent on at least one of a magnitude of the frequency event, a duration of the frequency event, or a rate of change of frequency response.

Clause 4. The method of any preceding clause, further comprising setting the first parameter to be dependent on a maximum value observed magnitude of the frequency event such that a response time of the renewable energy power system is reduced during the frequency event and resetting the first parameter to an initial value only after the frequency event is over to ensure that the time constant remains fast for the duration of the frequency event.

Clause 5. The method of any preceding clause, wherein the frequency filter assembly comprises a lag filter.

Clause 6. The method of any preceding clause, wherein determining the time constant for the frequency filter assembly as a function of two or more parameters of the frequency signal further comprises utilizing at least one of a look-up table, a function, or an algorithm.

Clause 7. The method of any preceding clause, further comprising comparing the frequency signal to a frequency threshold to determine the presence of the frequency event occurring in the power grid.

Clause 8. The method of any preceding clause, wherein the frequency event comprises at least one of a high frequency event, a low frequency event, or a frequency event of a certain duration.

Clause 9. The method of any preceding clause, further comprising resetting the time constant to a default value when the filtered frequency returns within a certain frequency deadband.

Clause 10. The method of any preceding clause, wherein the renewable energy power system comprises at least one of a wind turbine power system, an energy storage system, a solar power system, or combinations thereof, and wherein the at least one renewable energy asset comprises at least one of a wind turbine, a solar panel, an energy storage device, or combinations thereof.

Clause 11. A method for controlling a renewable energy power system having at least one renewable energy asset connected to a power grid during a frequency event, the method comprising:

receiving, via a controller, a frequency signal of the power grid; filtering the frequency signal via a first frequency filter having a dynamic time constant, the dynamic time constant varying as a function of a first parameter; and, filtering the frequency signal via a second frequency filter having a dynamic time constant, the dynamic time constant varying as a function of a second parameter of the frequency signal;

selecting one of the filtered frequency signals; and, controlling the at least one renewable energy asset based on the selected filtered frequency signal.

Clause 12. A system for controlling a renewable energy power system having at least one renewable energy asset connected to a power grid during a frequency event, the system comprising:

one or more sensors for measuring a frequency signal of the power grid; a frequency filter assembly for filtering the frequency signal, the frequency filter assembly having a dynamic time constant, the dynamic time constant varying as a function of two or more parameters of the frequency signal; and, a controller configured to perform a plurality of operations, the plurality of operations comprising:

determining a power command for the at least one renewable energy asset using the filtered frequency signal; and, controlling the at least one renewable energy asset based on the power command.

Clause 13. The system of clause 12, wherein the two or more parameters comprise, at least, a first parameter and a second parameter, the first parameter and second parameters being dependent on at least one of a magnitude of the frequency event, a duration of the frequency event, or a rate of change of frequency response Clause 14. The system of clauses 12-13, further comprising setting the first parameter to be dependent on a maximum observed magnitude of the frequency event such that a response time of the renewable energy power system is reduced during the frequency event and resetting the first parameter to an initial value only after the frequency event is over to ensure that the time constant remains fast for the duration of the frequency event.

Clause 15. The system of clauses 12-14, wherein the frequency filter assembly comprises a lag filter.

Clause 16. The system of clauses 12-15, wherein the dynamic time constant is determined vie at least one of a look-up table, a function, or an algorithm.

Clause 17. The system of clauses 12-16, wherein the plurality of operations further comprise comparing the frequency signal to a frequency threshold to determine the presence of the frequency event occurring in the power grid.

Clause 18. The system of clauses 12-17, wherein the frequency event comprises at least one of a high frequency event, a low frequency event, or a frequency event of a certain duration.

Clause 19. The system of clauses 12-18, wherein the plurality of operations further comprise resetting the time constant to a default value when the filtered frequency returns within a certain frequency deadband.

Clause 20. The system of clauses 12-19, wherein the renewable energy power system comprises at least one of a wind turbine power system, an energy storage system, a solar power system, or combinations thereof, and wherein the at least one renewable energy asset comprises at least one of a wind turbine, a solar panel, an energy storage device, or combinations thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a renewable energy power system having at least one renewable energy asset connected to a power grid, the renewable energy power system providing a power output demanded by the power grid during a frequency disturbance of the power grid, the method comprising:

receiving, via a controller, a grid frequency signal of the power grid;

determining a time constant for a frequency filter assembly as a function of at least a first grid parameter of the grid frequency signal of the power grid and a second grid parameter of the grid frequency signal of the power grid, the first parameter and the second parameter dependent on at least one of a magnitude of the frequency disturbance of the power grid, a duration of the frequency disturbance of the power grid, or a rate of change of frequency response, the first grid parameter further dependent on a maximum value observed magnitude of the frequency disturbance of the power grid such that a response time of the renewable energy power system is reduced during the frequency disturbance event, wherein the frequency disturbance results from a load-to-power imbalance in the power grid;

filtering the grid frequency signal via the frequency filter assembly using the determined time constant;

determining a power command for the at least one renewable energy asset using the filtered grid frequency signal;

controlling the at least one renewable energy asset based on the power command; and resetting the first grid parameter to an initial value only after the frequency disturbance of the power grid is over to ensure that the time constant remains fast for the duration of the frequency disturbance of the power grid.

2. The method of claim 1, further comprising measuring the grid frequency signal via one or more sensors.

3. The method of claim 1, wherein the frequency filter assembly comprises a lag filter.

4. The method of claim 1, wherein determining the time constant for the frequency filter assembly as a function of two or more grid parameters of the grid frequency signal further comprises utilizing at least one of a look-up table, a function, or an algorithm.

5. The method of claim 1, further comprising comparing the grid frequency signal to a frequency threshold to determine the presence of the frequency disturbance of the power grid occurring in the power grid.

6. The method of claim 1, wherein the frequency disturbance of the power grid comprises at least one of a high frequency disturbance of the power grid, a low frequency disturbance of the power grid, or a frequency disturbance of the power grid of a certain duration.

7. The method of claim 1, further comprising resetting the time constant to a default value when the filtered frequency returns within a certain frequency deadband.

8. The method of claim 1, wherein the renewable energy power system comprises at least one of a wind turbine power system, an energy storage system, a solar power system, or combinations thereof, and wherein the at least one renewable energy asset comprises at least one of a wind turbine, a solar panel, an energy storage device, or combinations thereof.

9. A system for controlling a renewable energy power system during a frequency disturbance of a power grid, the renewable energy power system connected to the power grid and providing a power output demanded by the power grid, the system comprising:

one or more sensors configured to monitor the power grid to detect the frequency disturbance resulting from a load-to-power imbalance in the power grid, and to measure a grid frequency signal of the power grid;

a frequency filter assembly for filtering the grid frequency signal, the frequency filter assembly having a dynamic time constant, the dynamic time constant varying as a function of at least a first grid parameter of the grid frequency signal of the power grid and a second grid parameter of the grid frequency signal of the power grid, wherein the first parameter and the second parameter are dependent on at least one of a magnitude of the frequency disturbance of the power grid, a duration of the frequency disturbance of the power grid, or a rate of change of frequency response, wherein the first grid parameter is further dependent on a maximum value observed magnitude of the frequency disturbance of the power grid such that a response time of the renewable energy power system is reduced during the frequency disturbance event; and, a controller configured to perform a plurality of operations, the plurality of operations comprising:

determining a power command for the at least one renewable energy asset using the filtered grid frequency signal;

controlling the at least one renewable energy asset based on the power command; and resetting the first grid parameter to an initial value only after the frequency disturbance of the power grid is over to ensure that the dynamic time constant remains fast for the duration of the frequency disturbance of the power grid.

10. The system of claim 9, wherein the frequency filter assembly comprises a lag filter.

11. The system of claim 9, wherein the dynamic time constant is determined vie at least one of a look-up table, a function, or an algorithm.

12. The system of claim 9, wherein the plurality of operations further comprise comparing the grid frequency signal to a frequency threshold to determine the presence of the frequency disturbance of the power grid occurring in the power grid.

13. The system of claim 9, wherein the frequency disturbance of the power grid comprises at least one of a high frequency disturbance of the power grid, a low frequency disturbance of the power grid, or a grid frequency disturbance of the power grid of a certain duration.

14. The system of claim 9, wherein the plurality of operations further comprise resetting the time constant to a default value when the filtered frequency returns within a certain frequency deadband.

15. The system of claim 9, wherein the renewable energy power system comprises at least one of a wind turbine power system, an energy storage system, a solar power system, or combinations thereof, and wherein the at least one renewable energy asset comprises at least one of a wind turbine, a solar panel, an energy storage device, or combinations thereof.

* * * * *